US012404832B2

(12) United States Patent
Hare et al.

(10) Patent No.: US 12,404,832 B2
(45) Date of Patent: Sep. 2, 2025

(54) MULTI PISTON MACHINE WITH AT LEAST THREE SWITCHABLE DISPLACEMENT VOLUMES

(71) Applicant: Robert Bosch GmbH, Stuttgart (DE)

(72) Inventors: David Hare, Kirkliston (GB); Iain Edward, North Queensferry (GB); Johann Praeffcke, Scotlandwell (GB)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 17/657,380

(22) Filed: Mar. 31, 2022

(65) Prior Publication Data

US 2022/0389902 A1 Dec. 8, 2022

(30) Foreign Application Priority Data

Jun. 7, 2021 (EP) .................................... 21177934
Jan. 25, 2022 (EP) .................................... 22153193

(51) Int. Cl.
*F03C 1/30* (2006.01)
*F03C 1/36* (2006.01)
*F03C 1/40* (2006.01)

(52) U.S. Cl.
CPC ............ *F03C 1/0409* (2013.01); *F03C 1/045* (2013.01); *F03C 1/0457* (2013.01); *F03C 1/0438* (2013.01)

(58) Field of Classification Search
None
See application file for complete search history.

(56) References Cited

U.S. PATENT DOCUMENTS 3,046,950 A * 7/1962 Smith .................. F01B 13/061 91/491
3,078,808 A * 2/1963 Byers, Jr. ............. F03C 1/0438 91/485
3,099,223 A * 7/1963 Mercier ................ F01B 1/0696 417/253
3,403,599 A * 10/1968 Guinot .................. F03C 1/2407 91/418
3,760,691 A * 9/1973 Kleckner ................ F03C 1/045 91/472

(Continued)

FOREIGN PATENT DOCUMENTS

DE 10 2011 115 665 A1 4/2013

*Primary Examiner* — Dominick L Plakkoottam
*Assistant Examiner* — Geoffrey S Lee
(74) *Attorney, Agent, or Firm* — Maginot, Moore & Beck LLP

(57) ABSTRACT

A multi piston machine includes a rotor, pistons, a first control valve, and a second control valve. The pistons abut against a cam surface with multiple lobes. The machine is switchable between at least three non-zero displacement volumes using the first and the second control valves. The first control valve is connected to a first and a third fluid chamber. The second control valve is connected to a second and a fourth fluid chamber. The first and the second control valve are connected to first and the second working port respectively. A third number of second control openings is twice a second number of the lobes. There is a first and a second group of the second control openings. Adjacent second control openings belong to a different first or second group. The second control openings of the first group are either connected to the first or the second fluid chamber.

17 Claims, 12 Drawing Sheets

(56) References Cited

U.S. PATENT DOCUMENTS 3,808,951 A * 5/1974 Martin .................... F03C 1/045 91/519
4,398,450 A * 8/1983 Louhio ................... F03C 1/045 91/477
4,404,896 A * 9/1983 Allart ...................... F03C 1/045 91/497
4,505,185 A * 3/1985 Jacobs .................. F16D 43/286 91/473
4,532,854 A * 8/1985 Foster ..................... F03C 1/045 91/472
4,724,742 A * 2/1988 Bigo ....................... F03C 1/045 91/497
4,807,519 A * 2/1989 Wusthof ................. F03C 1/045 91/519
4,898,076 A * 2/1990 Bigo ....................... F03C 1/045 91/491
5,001,964 A * 3/1991 Allart ...................... F04B 1/063 60/420
5,435,135 A * 7/1995 Lallier .................... F03C 1/045 60/483
5,836,231 A * 11/1998 Leinonen ............ F04C 15/0084 91/519
5,944,493 A * 8/1999 Albertin ................ F04B 49/126 91/481
6,050,173 A * 4/2000 Sakai ...................... F03C 1/045 91/482
6,099,273 A * 8/2000 Allart ...................... F03C 1/045 91/472
6,318,235 B1 * 11/2001 Allart ...................... F03C 1/045 91/519
8,162,621 B2 * 4/2012 Walker .................. F01B 13/068 417/273
2008/0189017 A1 * 8/2008 Ryyppo ................ F16H 61/448 701/51
2008/0210500 A1 * 9/2008 Walker ................... B60K 6/105 701/70
2010/0101406 A1 * 4/2010 Walker .................... F04B 1/053 417/273
2018/0202421 A1 * 7/2018 Collins ................. F04B 1/0439

* cited by examiner

MULTI PISTON MACHINE WITH AT LEAST THREE SWITCHABLE DISPLACEMENT VOLUMES

This application claims priority under 35 U.S.C. § 119 to (i) patent application no. EP 21177934.3, filed on Jun. 7, 2021 in Europe, and (ii) patent application no. EP 22153193.2 filed on Jan. 25, 2022 in Europe. The disclosures of the above-identified patent applications are both incorporated herein by reference in their entirety.

The disclosure concerns a multi piston machine as disclosed herein.

BACKGROUND

A corresponding multi piston machine is known from U.S. Pat. No. 6,050,173, which is configured as a radial piston motor. This multi piston machine has two switchable displacements. In a first switching position, all pistons are connected either to the first or the second working port in each rotational position of the rotor. In a second switching position, there is an internal short circuit connection between a first group of pistons, which are not connected to the first second working port. The remaining pistons form a second group of pistons which are connected either to the first or the second working port.

U.S. Pat. No. 4,807,519 shows another radial piston motor with two switchable displacements. To avoid pressure variations with the short circuited pistons there is a connection to a pilot pressure.

U.S. Pat. No. 5,836,231 shows a radial piston motor with switchable displacement volumes, wherein a first and a second control valve is used to switch the displacement volumes, wherein two or more displacement volumes are possible.

SUMMARY

The aim of the disclosure is to provide a multi piston machine with at least three switchable non-zero displacement volumes. The multi piston machine should have a high energy efficiency. It should be compact in size so that it can be integrated into a wheel of a vehicle. The torque ripple should be low. The manufacturing of the multi piston machine should be easy and cost effective.

As disclosed herein, the multi piston machine is switchable between at least three non-zero displacement volumes by means of a first and a second control valve, wherein the first control valve is connected to the first and the third fluid chamber, wherein the second control valve is connected to the second and the fourth fluid chamber, wherein the first and the second control valve are connected to the first and the second working port respectively, wherein the third number is twice the second number, wherein there is a first and a second group of second control openings, wherein adjacent second control openings belong to a different first or second group, wherein the second control openings of the first group are either connected to the first or the second fluid chamber, wherein the second control openings of the second group are either connected to the third or the fourth fluid chamber.

Preferably, the first control openings are located equally distributed along the first circle, wherein most preferably, they are identical to each other. Preferably, the second control openings are located, at least nearly, equally distributed along the second circle, wherein most preferably, they are, at least nearly, identical to each other. It is possible the reduce pressure peaks by slightly offsetting the second control openings from the ideal location or by providing somewhat different sized second control openings.

Preferably, the first and the second circle have the same diameter. Preferably, the first control valve is permanently connected to the first and the third fluid chamber. Preferably, the second control valve is permanently connected to the second and the fourth fluid chamber. Preferably, the first and the second control valve are permanently connected to the first and the second working port respectively. Preferably, the first control surface is rotationally symmetrical with respect to the axis of rotation. Most preferably, the first control surface is flat and perpendicular to the axis of rotation. Preferably, the multi piston machine is configured as a radial piston motor, i.e. the pistons move radially with respect to the axis of rotation. Preferably, the cam surface is provided by a separate cam ring or a separate second casing part which surrounds the rotor.

Preferably, the first and the second control valves are formed by valves which work independently of each other, wherein especially the corresponding valve spools work independently of each other. It is possible to integrate the first and second control valve into one unitary valve, wherein different sections of the corresponding unitary valve spool correspond to the first and the second control valve. The second embodiment is much more expensive and needs much more space.

The displacement volume of the multi piston machine is the volume of pressure fluid which is fed through the multi piston machine during one revolution of the rotor. The maximum displacement volume is equal to the sum of the displacement volumes of each individual piston. Preferably, the pressure fluid is a liquid, wherein most preferably, the pressure fluid is hydraulic oil.

Further improvements of the disclosure are indicated in the dependent claims.

According to a preferred embodiment, the first control valve has a first and a second position, wherein in the first position the first fluid chamber is connected to the first working port, wherein the third fluid chamber is connected to the second working port, wherein in the second position the first and the third fluid chamber are directly connected to each other, wherein the connection to the first and the second working port is blocked. With this configuration a first reduced displacement volume is defined by the number of second control openings connected to second and fourth fluid chamber. Preferably, an equal number of second control openings are connected to the second and the fourth fluid chamber.

According to a preferred embodiment, the first control valve has a first control port, wherein a pressure at the first control port urges the first control valve into the second position, wherein in the second position the first control port is connected to the first and the third fluid chamber, wherein in the first position the aforementioned connection is blocked. As described below within the short circuit provided by the second position there is typically some flow miss-match, which results in pressure peaks or torque ripple. This effect can be reduced by the disclosed connection to the first control port.

According to a preferred embodiment, the second control valve has a third and a fourth position, wherein in the third position the second fluid chamber is connected to the first working port, wherein the fourth fluid chamber is connected to the second working port, wherein in the fourth position the second and the fourth fluid chamber are directly connected to each other, wherein the connection to the first and the second working port is blocked. With this configuration a second reduced displacement is defined by the number of second control openings connected to first and third fluid chamber. Preferably, an equal number of second control openings are connected to the first and the third fluid chamber.

According to a preferred embodiment, the second control valve has a second control port, wherein a pressure at the second control port urges the second control valve into the fourth position, wherein in the fourth position the second control port is connected to the second and the fourth fluid chamber, wherein in the third position the aforementioned connection is blocked. As described below within the short circuit provided by the fourth position there is typically some flow miss-match, which results in pressure peaks or torque ripple. This effect can be reduced by the disclosed connection to the second control port.

According to a preferred embodiment, when the first control valve is in the second position and the second control valve is in the fourth position the first and the second working port are directly connected to each other via the first and the second control valve. In this state the net displacement volume of the multi piston machine is zero. The disclosed connection provides a further free-wheeling state of multi piston machine additional to the three different non-zero displacement volumes. Preferably, there is a fluid chamber which provides a corresponding connection between the first and second control valve.

According to a preferred embodiment, the first fluid chamber is connected to a fourth number of second control openings, wherein the third fluid chamber is connected to the same fourth number of second control openings, wherein the second fluid chamber is connected to a fifth number of second control openings, wherein the fourth fluid chamber is connected to the same fifth number of second control openings, wherein the fourth and the fifth number differ by at least one. This results in two different reduced displacement volumes of the multi piston machine, which are switchable by the first and second control valve.

According to a preferred embodiment, the first number is larger than the third number by at least three. With this selection the multi piston machine provides three different values of a non-zero displacement volume which are particularly useful for a vehicle drive.

According to a preferred embodiment, the first and the second number have no common prime factor besides one, wherein the cam surface has at least two dwell sections, in which the distance between the axis of rotation and the cam surface is constant, such that a piston contacting the dwell section does not move while the rotor rotates, wherein an angular extend of at least two dwell sections is different from each other. It should be clear that named angular extend is measured with respect to the axis of rotation. Preferably, the majority of dwell sections have an angular extend of about 1°. Preferably, there is at least one dwell section which has an angular extend of about 2°. Preferably, the dwell sections are located at a position where the first control opening of a piston contacting the dwell section switches over from one second control opening to an adjacent second control opening.

According to a preferred embodiment, the first number is eighteen, wherein the second number is seven, wherein the third number is fourteen, wherein the fourth number is three, wherein the fifth number is four. This selection results in an exceptional good compromise between a low number of pistons and three different values of a non-zero displacement volume that are particularly useful for a vehicle drive.

According to a preferred embodiment, within the same first or second group at maximum two adjacent second control openings are connected to the same fluid chamber from the first to fourth fluid chamber. With this selection the torque ripple of the multi piston machine is low independent of the selected displacement volume.

According to a preferred embodiment, the moving direction of the pistons is radially with respect to the axis of rotation, wherein there are a first and a second row of pistons, wherein the first and the second row of pistons are offset relative to each other in the direction of the axis of rotation. Compared to a single-speed or a two-speed multi piston machine the inventive design typically results in a higher number of pistons. With the two staggered rows of pistons, the result is still a compact multi piston machine.

According to a preferred embodiment, the lobes of the cam surface define multiple dead centers, wherein a distance from the cam surface to the axis of rotation is minimum or maximum at a dead center, wherein each second control opening is located distant to the named dead centers in circumferential direction with respect to the axis of rotation. Preferably, the dead centers are each arranged in the center between two adjacent second control openings. This results in a low torque ripple of the multi piston machine.

It goes without saying that the features mentioned above and those which are still to be explained below can be used not only in the particular combination indicated but also in other combinations or in independent form without departing from the scope of the present disclosure.

BRIEF DESCRIPTION OF THE DRAWINGS

The disclosure is explained in more detail below with reference to the accompanying drawings.

DETAILED DESCRIPTION

Figure 1:
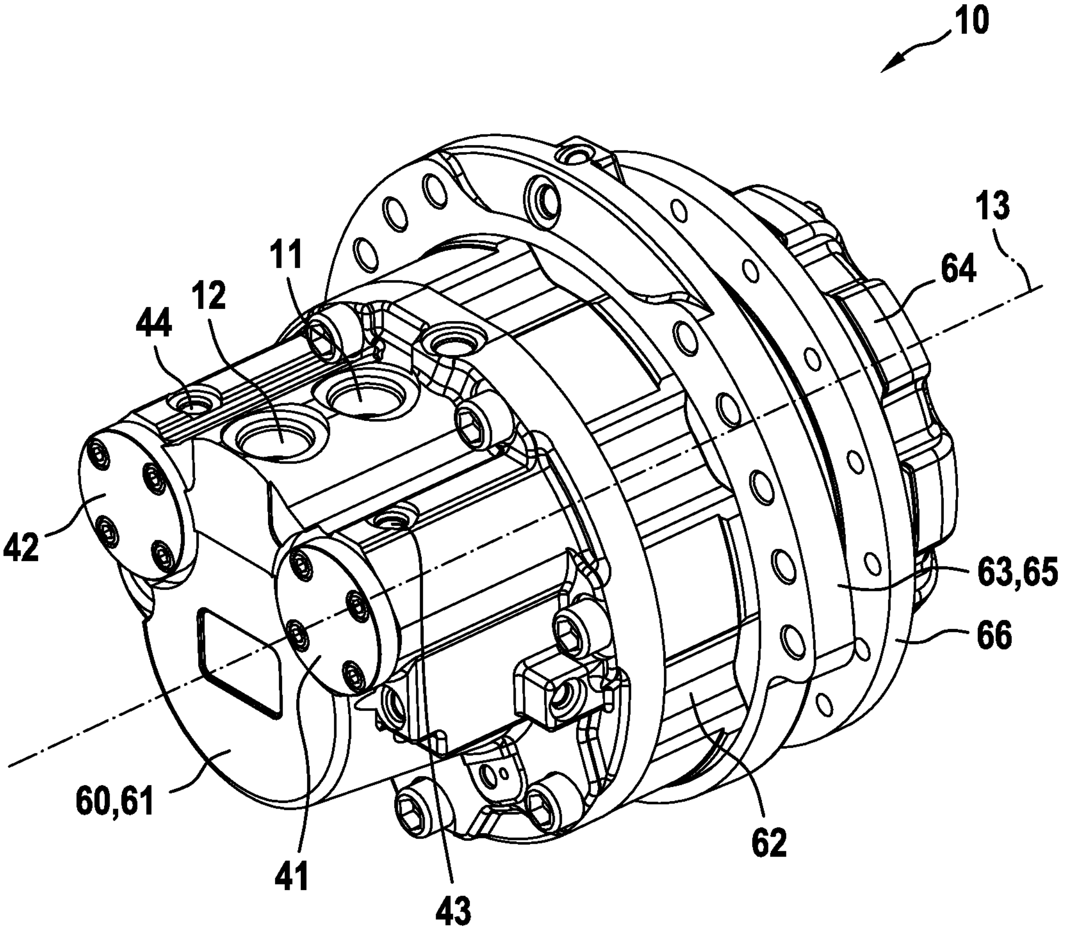
FIG. 1 is a perspective view of an inventive multiple piston machine.

FIG. 1 shows a perspective view of an inventive multiple piston machine. The multiple piston machine 10 has a casing

60 comprising a first, a second, a third and a fourth casing part 64, which together enclose all components of the multiple piston machine 10 in a fluid tight manner. The first, the second and the third casing part 61; 62; 63 are fixed to each other. Preferably, the third casing part 63 has a first flange 65, which can be connected to a frame of a vehicle for example. The fourth casing part 64 is rotatable about an axis of rotation 13 with respect to the remaining casing 61; 62; 63. It has a second flange 66, which can be connected to a wheel of the named vehicle for example.

The cup shaped first casing part 61 holds the distributor (no. 30 in FIG. 3) and the first and the second control valve 41; 42, wherein no. 41; 42 actually point to a lid, which covers a spool of the first or second control valve 41; 42 respectively. The first and the second working port 11; 12 and the first and the second control port 43; 44 are located at the first casing part 61.

The second casing part 62 surrounds the rotor (no. 70 in FIG. 2) in a ring shaped manner. The inner circumferential surface of the second casing part 62 extents along the axis of rotation 13 with a constant cross section, wherein it forms the cam surface (no. 21 in FIG. 4).

The third casing part 63 surrounds a disc brake, which is known from EP 2 841 763 B1 for example. The fourth casing part 64 is fixed to the rotor (no. 70 in FIG. 2), via a splined shaft which is formed by the fourth casing part 64. The named shaft is supported by the third casing part 63 via roller bearings.

Figure 2:
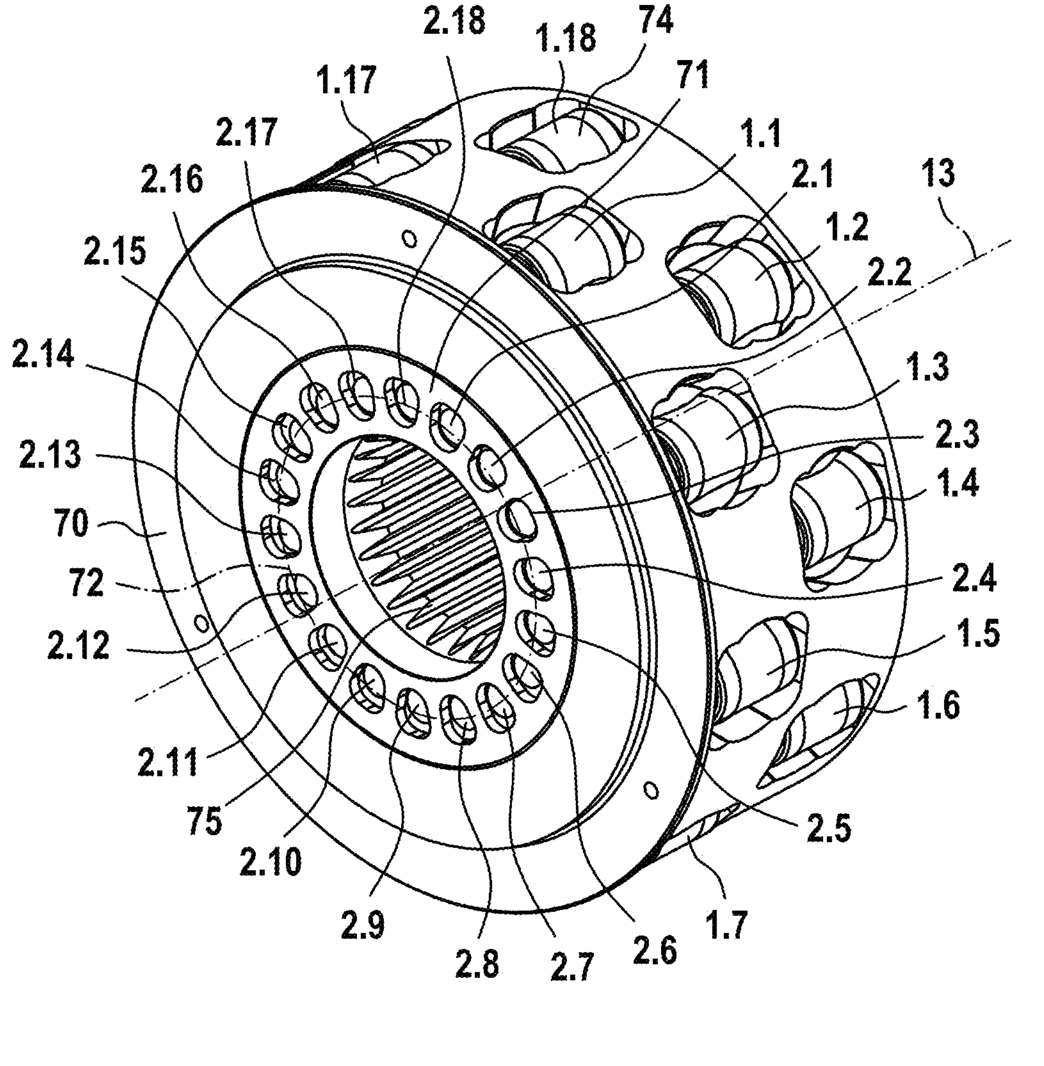
FIG. 2 is a perspective view of a rotor of the machine of FIG. 1.

FIG. 2 shows a perspective view of the rotor 70. The rotor 70 at hand has eighteen pistons 1.1-1.18. The reference numerals 1.1-1.18 are assigned in numerical order around the rotor 70. There are two rows of pistons, wherein each row comprises one half of the total number of pistons. The two rows are shifted to each other in the direction of the axis of rotation 13 to allow for a larger diameter of each individual piston 1.1-1.18. The pistons 1.1-1.18 are movable radially with respect to axis of rotation 13, such that the axis of movement intersects axis of rotation 13 at 90°. It should be noted that the disclosure is not restricted to this angle. The axis of movement of the pistons could also be parallel to the axis of rotation 13 for example.

All pistons 1.1-1.18 are shown in their most inward position. During operation the piston 1.1-1.18 stick out of the rotor 70 such that they contact the cam surface (no. 21 in FIG. 4) with a roller 74. The roller 74 is held rotatably in the remaining piston via a hydrostatic bearing such that it can rotate with low friction despite the high forces acting on the pistons 1.1-1.18. All pistons are configured identically.

The rotor 70 has an even first control surface 71, which is perpendicular to the axis of rotation 13. On the first control surface 71 there is a first control opening 2.1-2.18 for each piston. The numbering (number after the point) of first openings 2.1-2.18 is identical to the numbering of the pistons 1.1-1.18. This means first control open 2.1 is connected to the cylinder (no. 73 in FIG. 4) of piston 1.1. The first control openings are equally distributed along a first circle 72 whose center is defined by the axis of rotation 13. All first control openings 2.1-2.18 are identical to each other, wherein they are circular.

The rotor 50 has a splined bore 75 via which it is connected to the fourth casing part (no. 64 in FIG. 1) in a rotationally fixed manner.

Figure 3:
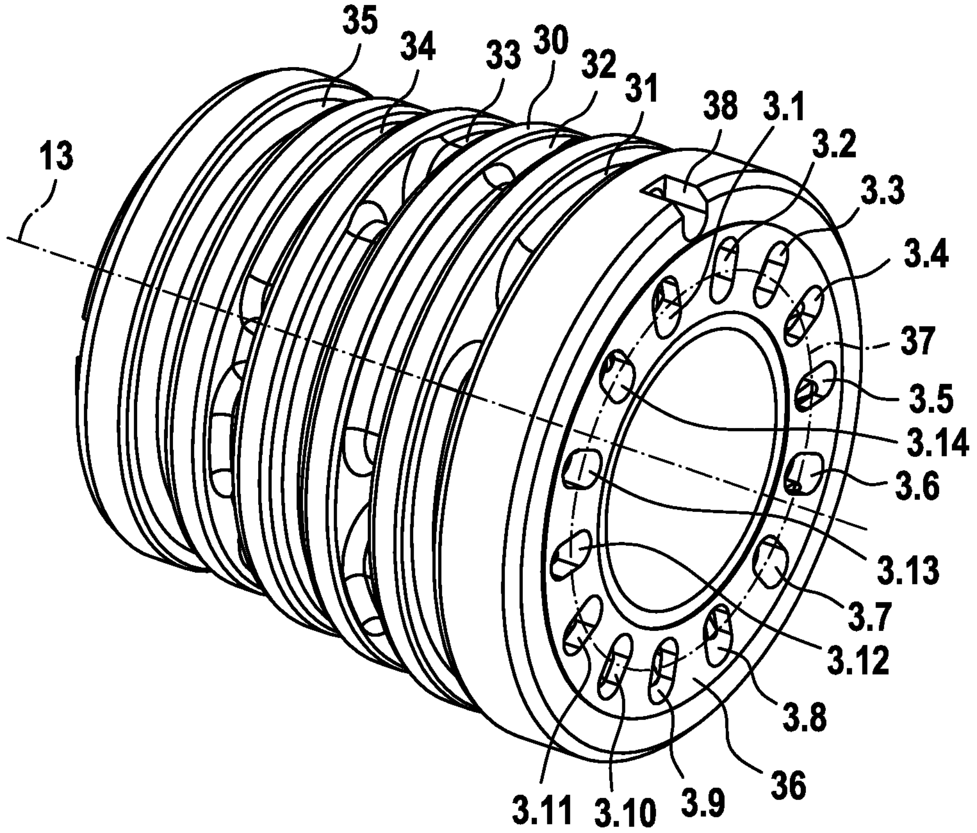
FIG. 3 is a perspective view of a distributor of the machine of FIG. 1.

FIG. 3 shows a perspective view of the distributor 30. The distributor 30 is a one-piece part providing the second control surface 36 and the first to fifth fluid chamber 31-35. The even second control surface 36 is perpendicular to the axis of rotation 13. It has fourteen second control openings 3.1-3.14 which are nearly equally distributed along a second circle 37 in numerical order. The center of the second circle is defined by the axis of rotation 13, wherein its diameter is equal to the diameter of the first circle (no. 72 in FIG. 2). The second control openings 3.1-3.14 are nearly identical to each other, wherein they are formed like an oblong hole which extends in radial direction.

The distributer 30 has an outer surface which rotationally symmetric with respect to the axis of rotation 13 and which is adapted to the first casing part (no. 61 in FIG. 1) in a fluid tight manner. The hydraulic pressure in the first to fifth fluid chamber 31-35 urges the distributer 30 in the direction of the axis of rotation 13, such that the second control surface 36 abuts against the first control surface (no. 71 in FIG. 1) in a fluid tight manner. During one revolution of the rotor each first control opening overlaps each second control opening in at least in one rotational position of the rotor.

The first to fifth fluid chamber 31-35 are for formed by grooves on the circumferential surface of the distributor 30, which are arranged along the axis rotation 13 in numerical order. The connection between the first to fourth fluid chambers 31-34 with the second control openings will be explained with reference to FIG. 4 below. These permanent connections are formed by channels inside the distributor 30, which were made during the casting of the blank distributor. The fifth fluid chamber provides a fluid connection between the first and the second control valve, which is marked in FIG. 5 with no. 35.

The notch 38 prevents a rotation of the distributor 30 with respect to the axis of rotation 13. A pin, which is held by the second casing part, extends into the notch 38. By definition the notch is located between the second control openings 3.1 and 3.2.

Figure 4:
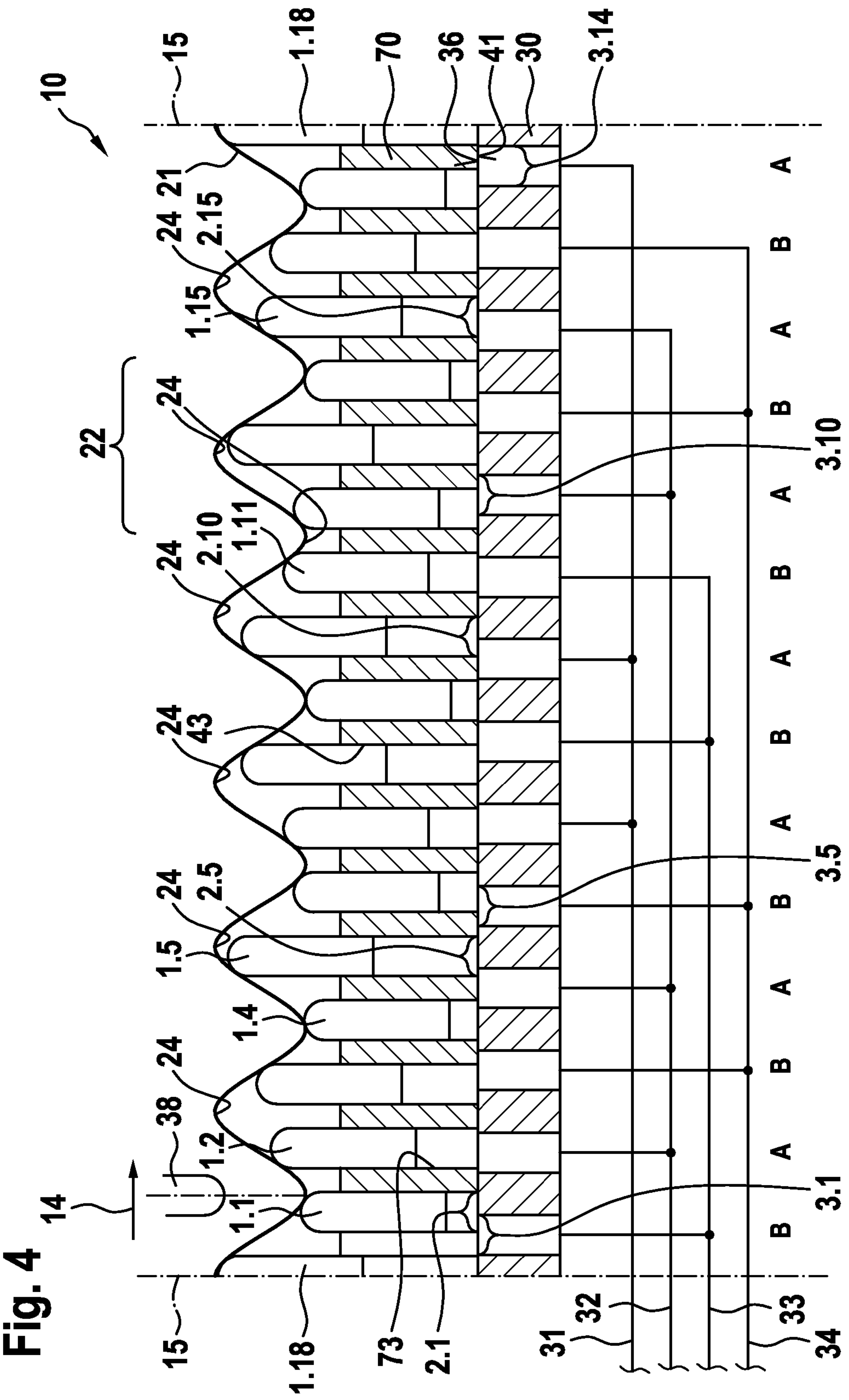
FIG. 4 is a schematic diagram illustrating pistons, first and second control openings, and first to fourth fluid chambers of the machine of FIG. 1.

FIG. 4 shows a schematic diagram comprising the pistons 1.1-1.18, the first and second control openings 2.1-2-18; 3.1-3.14 and the first to fourth fluid chamber 31; 32; 33; 34. For sake of clarity, some of the reference numerals 1.1-1.18; 2.1-2.18; 3.1-3.14 are not shown. In all three cases, there is a consecutive numbering, which ascends from left to right in FIG. 4.

The piston 1.1-1.18 are equally distributed around the axis of rotation (no. 13 in FIG. 2), wherein they are shown in an unfolded way in FIG. 4. The cam surface 21, the rotor 70 and the distributor 30 are shown correspondingly. The two dash-dot lines 15 refer to the same circumferential position with respect to the axis of rotation (no. 13 in FIG. 2, namely the center of piston 1.18.

The cam surface 21 on the inner circumference of the second casing part (no. 62 in FIG. 1) has seven lobes, wherein it is basically sinus shaped. Further details are explained with reference to FIG. 6. The fluid pressures in the cylinders 74 urge the moveable pistons 1.1-1.18 against the cam surface 21 such that they follow the cam surface 21 when the rotor 70 rotates. In consequence during one rotation of the rotor 70 each piston 1.1-1.18 executes seven strokes.

The distributor 30 has fourteen second control openings 3.1-3.14, i.e., two for each lobe of the cam surface 21. The rotational position of the distributor 30 relative to the cam surface 21 is fixed by a notch 38 (see FIG. 3 too) which engages with a cylindrical pin fixed in the second casing part (no. 62 in FIG. 1), such that each dead center (maximum or minimum) of the cam surface 21 is located between two neighboring second control openings 3.1-3.14.

The rotor 70 has eighteen pistons 1.1-1.18 which are accommodated in a respective cylinder 73 of the rotor 70 so that the can move linearly. Each piston 1.1-1.18 contacts the cam surface 21 via a roller (no. 74 in FIG. 2) which is not shown in FIG. 4. Each cylinder 73 has as a respective first control opening 2.1-2.18, wherein each first control opening 2.1-2.18 overlaps each second control opening 3.1-3.14 during one rotation of the rotor 70.

Below no. 30 in FIG. 4 the internal connections of the distributor are shown, which are selected to provide three switchable non-zero displacement volumes according to the disclosure. Since the first number of pistons 1.1-1.18 and the third number of second control openings 3.1-3.14 have number two as a common prime factor there are pairs of pistons which have a 180° phase relation. For instance piston 1.2 and 1.11 show a phase relation of 180°. In theory it is possible to short circuit such a pair of pistons so that it does no contribute to the overall displacement volume of the multi piston machine, wherein no pressure peaks are produced. This is the basic working principle of US 6,050,173 A. But exactly this option is not used with the present disclosure. There is no position of the first and second control valve (no. 41; 42 in FIG. 5) which results in such a short circuit of the named pair of pistons 1.2/1.11, i.e. in a short circuit between the second and third fluid chamber 32; 33 in the rotor position shown in FIG. 4. Instead the disclosed connections are used.

There is a first and second group of second control openings A; B, wherein neighboring second control openings 2.1-2.14 belong to a different first or second group A; B. The first fluid chamber 3.1 is permanently connected to three second control openings 3.6; 3.8; 3.14 belonging to the first group A. The second fluid chamber 32 is permanently connected to four second control openings 3.2; 3.4; 3.10; 3.12 belonging to the first group A. The third fluid chamber 33 is permanently connected to three second control openings 3.1; 3.7; 3.9 belonging to the second group B. The fourth fluid chamber 34 is permanently connected to four second control openings 3.3; 3.5; 3.11; 3.13 belonging to second group B.

Figure 5:
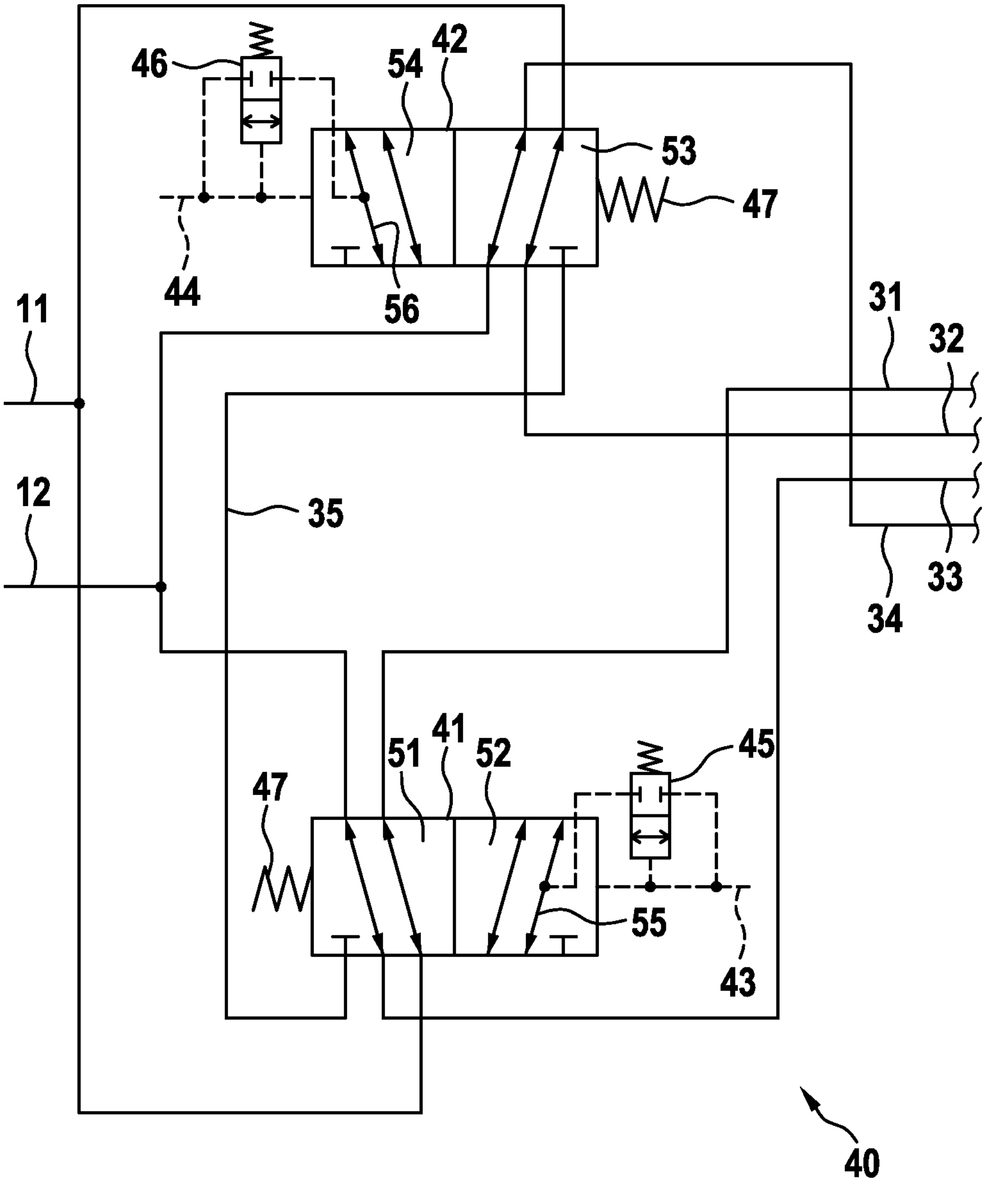
FIG. 5 is a schematic illustrating first and the second control valves, the first to the fifth fluid chambers, and first and second working ports of the machine of FIG. 1.

FIG. 5 shows a schematic comprising the first and the second control valve 41; 42, the first to fifth fluid chamber 31-35 and the first and the second working port 11; 12. The first and the second control valve 41; 42 and the first and the second auxiliary valve 45; 56 are preferably configured as spool valves respectively. The first control valve 41; has a first and a second position 51; 52, wherein the second control valve 42 has a third and a fourth position 53; 54. In FIG. 5, the first and third positions 51; 53 are active such that all second control openings belonging to group A are connected to the first port 11, wherein all second control openings belonging to group B are connected to the second working port 12. Namely the first control valve 41 connects the first working port 11 with the first fluid chamber 31 and the second working port 12 with the third fluid chamber 33. The second control valve 42 connects the first working port 11 with the second fluid chamber 32 and the second working port 12 with the fourth fluid chamber 34. The fifth fluid chamber 35 is not used in this switching position, in which the multi piston machine works with the maximum displacement volume.

The second to maximum displacement volume is active, when the first control valve 41 is in the second position 52, wherein the second control valve 42 is in the third position 53. Then the first working port 11 is only connected to the second fluid chamber 32, wherein the second working port 12 is only connected to the fourth fluid chamber 34 wherein both connections are provided by the second control valve 42. The first control valve 41 provides a direct connection between the first and the third fluid chamber 31; 33 via its first short circuit connection 55. Consequently the second control openings 3.1; 3.6; 3.7; 3.8; 3.9; 3.14 are connected to each other. The two pairs 3.1/3.8 and 3.8/3.14 provide an exact 180° phase shift. The remaining pair 3.6/3.9 does not exactly provide a 180° phase shift, but nearly. To minimize pressure peaks due to this small miss-match the first auxiliary valve 45 provides a connection between the first short connection 55 and the first control port 43, when it is switched into its open position by a pressure in the first control port 43, which urges the first control valve 41 into is second position 52. In this state eight of the fourteen second control openings contribute to the net displacement volume so that the net displacement volume is 8/14 of the maximum displacement volume.

The third to maximum displacement volume is active, when the first control valve 41 is in the first position 51, wherein the second control valve 42 is in the fourth position 54. Then the first working port 11 is only connected to the first fluid chamber 31, wherein the second working port 12 is only connected to the third fluid chamber 33 wherein both connections are provided by the first control valve 41. The second control valve 42 provides a direct connection between the second and the fourth fluid chamber 32; 34 via its second short circuit connection 56. Consequently the second control openings 3.2; 3.3; 3.4; 3.5; 3.10; 3.11; 3.12; 3.13 are connected to each other. The three pairs 3.3/3.10; 3.4/3.11; and 3.5/3.12 provide an exact 180° phase shift. The remaining pair 3.2/3.13 does not exactly provide a 180° phase shift, but nearly. To minimize pressure peaks due to this small miss-match the second auxiliary valve 46 provides a connection between the second short connection 46 and the second control port 44, when it is switched into its open position by a pressure in the second control port 44, which urges the second control valve 42 into its fourth position 54. In this state six of the fourteen second control openings contribute to the net displacement volume so that the net displacement volume is 6/14 of the maximum displacement volume.

When first control valve 41 is switch into its second position 52 and the second control valve 42 is switched into its fourth position 54 the multi piston machine is in a free-wheeling state. There is a direct connection between the first and the second working 11; 12 ports via the fifth fluid chamber 35. Furthermore, the first to fourth fluid chamber 31-34 are short circuited to each other. When the multi piston machine drives an associated wheel of a vehicle, the wheel can be turned with low resistance, wherein fluid pressure at the first or second working port 11; 12 does not drive the vehicle.

Figure 6:
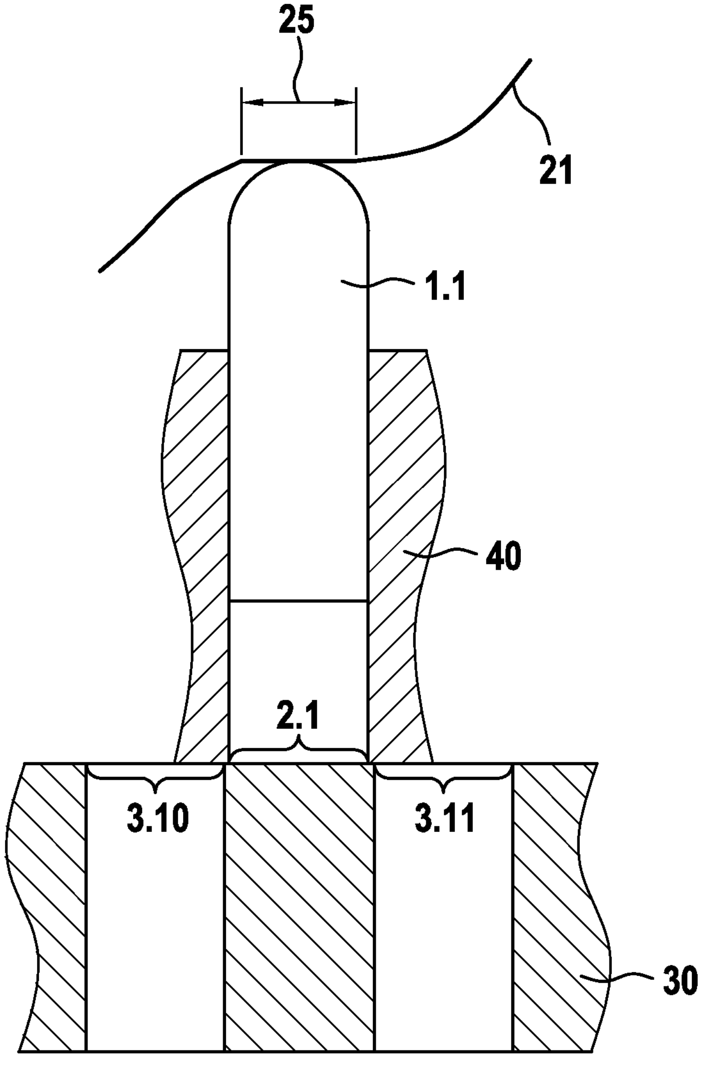
FIG. 6 is a schematic diagram based on FIG. 3 illustrating dwell sections of the machine of FIG. 1.

FIG. 6 shows a schematic diagram based on FIG. 3 comprising the dwell sections 25. As described above in the reduced displacement modes some deviation from a perfect 180° phase relationship is accepted. Most of the time the resulting pressure peaks are satisfactorily minimized by the first and second auxiliary valves (no. 45; 46 in FIG. 5). The pressure peaks may be further reduced by introducing dwell sections 25 at critical positions of the cam surface 21. A dwell section 25 extends to about 0.5° to 2° of rotor rotation. The dwell section 25 is formed in a way that a piston contacting the dwell section 25 does not move when the rotor is turned, as long as it contacts the dwell section 25.

Based on experiment it can easily be figured out at which rotational positions the pressure peaks occur. Based on the description above the pistons producing the pressure peaks are known. The dwell sections 25 are introduced correspondingly. Their length is selected as low as possible but long enough to reduce the offending pressure peaks. Experiments of the applicant have shown that it is desirable the choose dwell sections 25 with different length at different positions. Preferably, the dwell sections 25 are located at a position where the offending piston e.g. 1.1 is at the center between two neighboring second control openings e.g. 3.10; 3.11.

Figure 7:
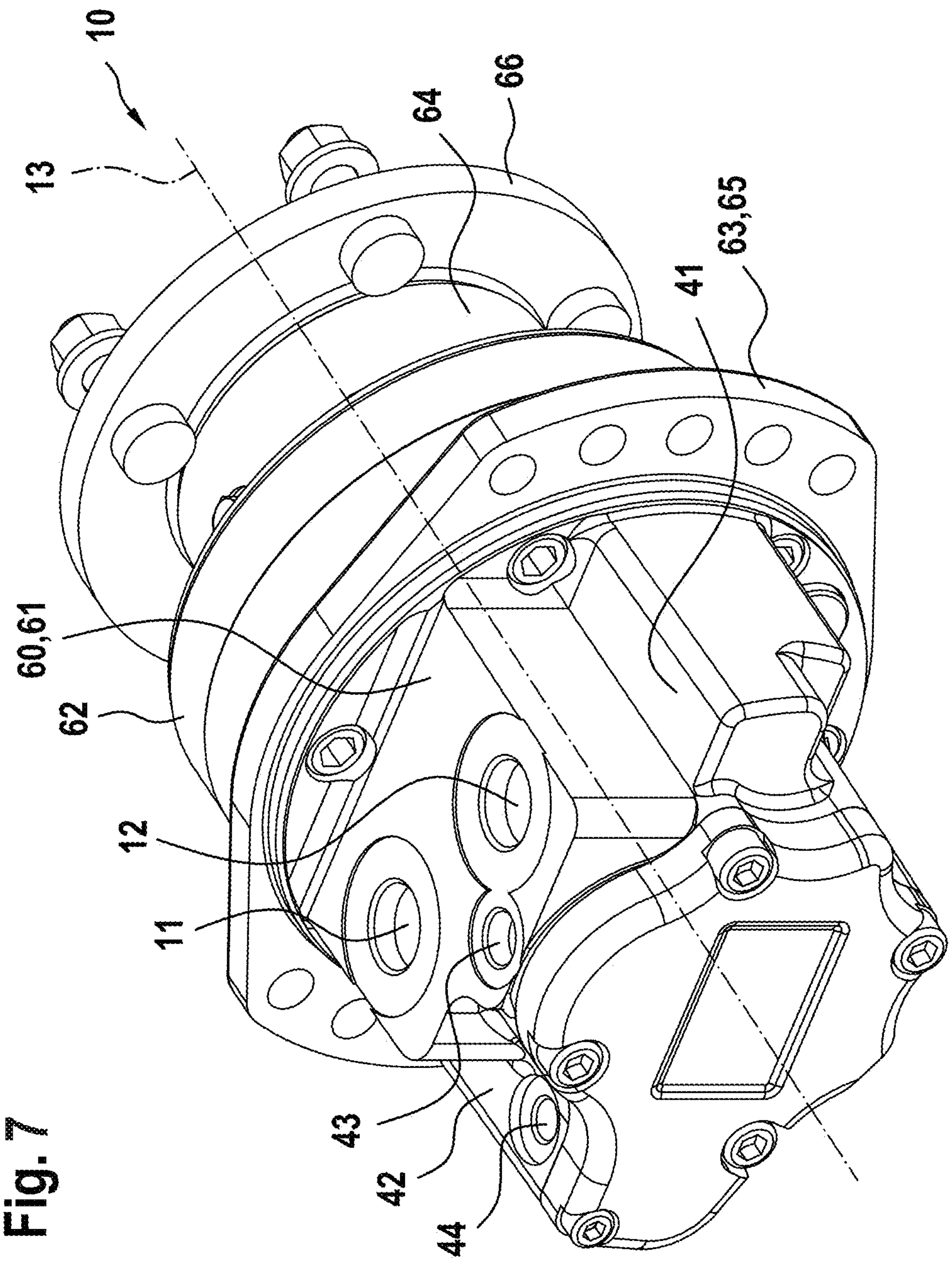
FIG. 7 is a perspective view of another inventive multiple piston machine.

FIG. 7 shows a perspective view of another inventive multiple piston machine 10. The multiple piston machine 10 has a casing 60 comprising a first, a second, a third and a fourth casing part 61; 62; 63; 64, which together enclose all components of the multiple piston machine 10 in a fluid tight manner. The first, the second and the third casing part 61; 62; 63 are fixed to each other. Preferably, the third casing part 63 has a first flange 65, which can be connected to a frame of a vehicle for example. The fourth casing part 64 is rotatable about an axis of rotation 13 with respect to the remaining casing 61; 62; 63. It has a second flange 66, which can be connected to a wheel of the named vehicle for example.

The cup shaped first casing part 61 holds the distributor (no. 30 in FIG. 9) and the first and the second control valve 41; 42, wherein no. 41; 42 actually point to the section of the casing 60, which covers a spool of the first or second control valve 41; 42 respectively. The first and the second working port 11; 12 and the first and the second control port 43; 44 are located at the first casing part 61.

The second casing part 62 surrounds the rotor (no. 70 in FIG. 8) in a ring shaped manner. The inner circumferential surface of the second casing part 62 extents along the axis of rotation 13 with a constant cross section, wherein it forms the cam surface (no. 21 in FIG. 10).

The third casing part 63 surrounds a disc brake, which is known from EP 2,841,763 B1 for example. The fourth casing part 64 is fixed to the rotor (no. 70 in FIG. 8), via a splined shaft which is formed by the fourth casing part 64. The named shaft is supported by the third casing part 63 via roller bearings.

Figure 8:
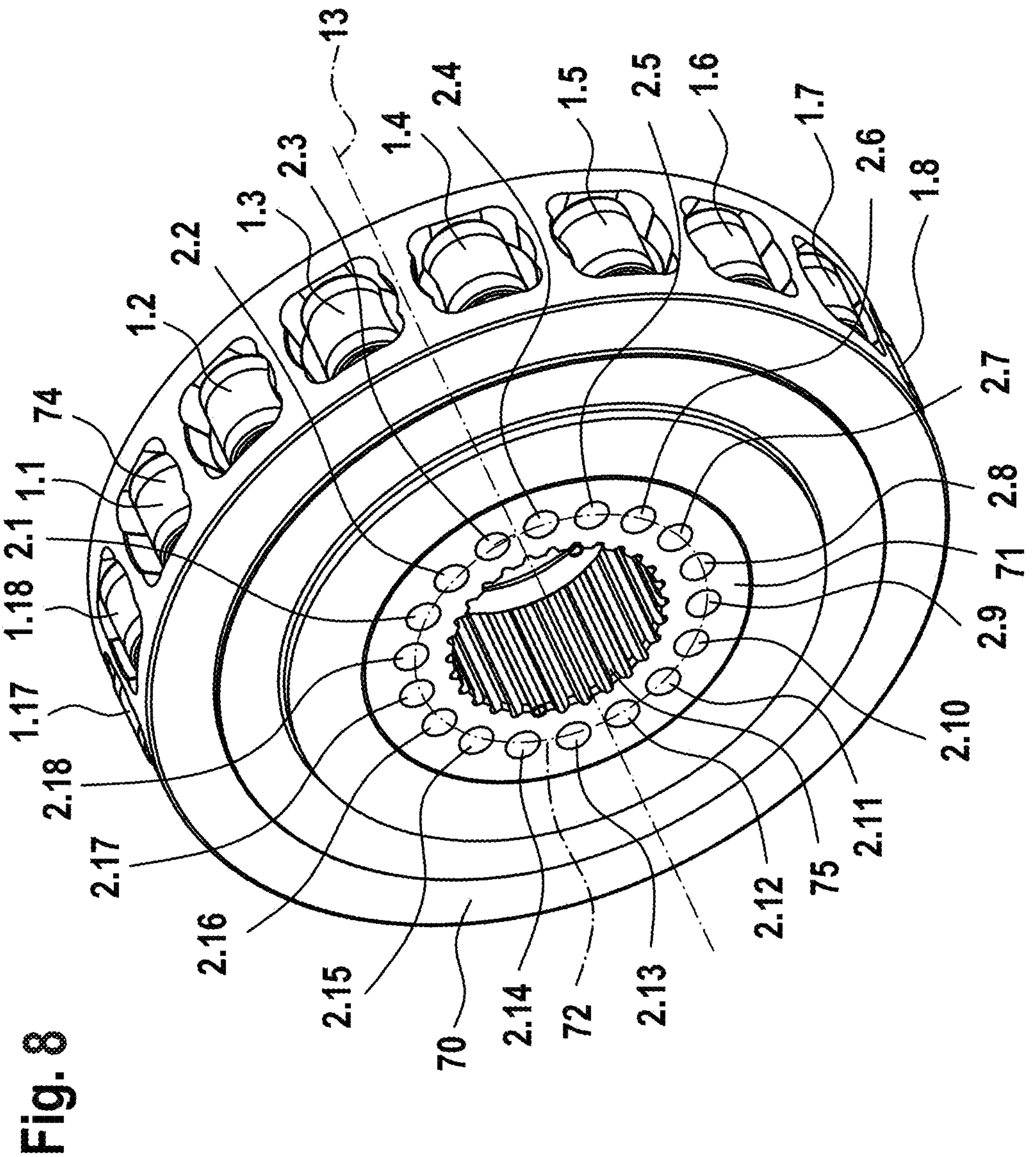
FIG. 8 is a perspective view of a rotor of the machine of FIG. 7.

FIG. 8 shows a perspective view of the rotor 70. The rotor 70 at hand has eighteen pistons 1.1-1.18. The reference numerals 1.1-1.18 are assigned in numerical order around the rotor 70. The pistons 1.1-1.18 are movable radially with respect to axis of rotation 13, such that the axis of movement intersects axis of rotation 13 at 90°. It should be noted that the disclosure is not restricted to this angle. The axis of movement of the pistons could also be parallel to the axis of rotation 13 for example.

All pistons 1.1-1.18 are shown in their most inward position. During operation the piston 1.1-1.18 stick out of the rotor 70 such that they contact the cam surface (no. 21 in FIG. 10) with a roller 74. The roller 74 is held rotatably in the remaining piston via a hydrostatic bearing such that it can rotate with low friction despite the high forces acting on the pistons 1.1-1.18. All pistons are configured identically.

The rotor 70 has an even first control surface 71, which is perpendicular to the axis of rotation 13. On the first control surface 71 there is a first control opening 2.1-2.18 for each piston. The numbering (number after the point) of first openings 2.1-2.18 is identical to the numbering of the pistons 1.1-1.18. This means first control open 2.1 is connected to the cylinder (no. 73 in FIG. 10) of piston 1.1. The first control openings are equally distributed along a first circle 72 whose center is defined by the axis of rotation 13. All first control openings 2.1-2.18 are identical to each other, wherein they are circular.

The rotor 50 has a splined bore 75 via which it is connected to the fourth casing part (no. 64 in FIG. 7) in a rotationally fixed manner.

Figure 9:
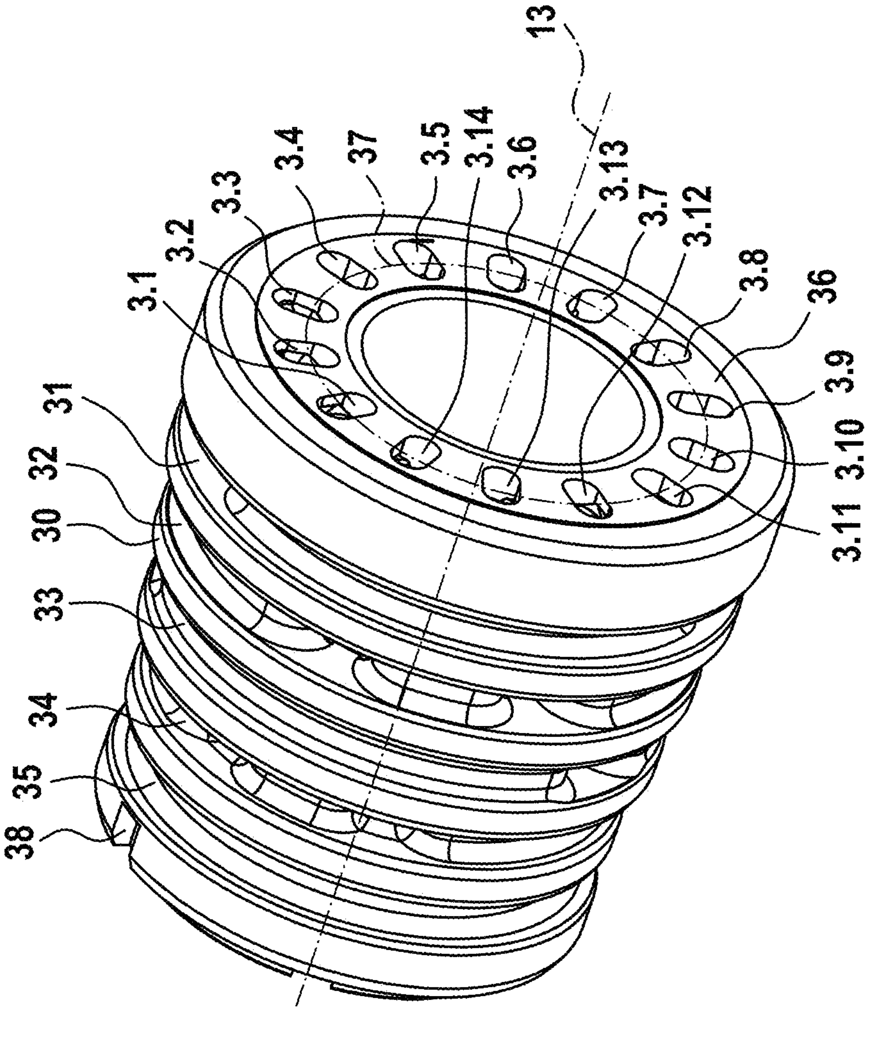
FIG. 9 is a perspective view of a distributor of the machine of FIG. 7.

FIG. 9 shows a perspective view of the distributor 30. The distributor 30 is a one-piece part providing the second control surface 36 and the first to fifth fluid chamber 31-35. The even second control surface 36 is perpendicular to the axis of rotation 13. It has fourteen second control openings 3.1-3.14 which are nearly equally distributed along a second circle 37 in numerical order. The center of the second circle 37 is defined by the axis of rotation 13, wherein its diameter is equal to the diameter of the first circle (no. 72 in FIG. 2). The second control openings 3.1-3.14 are nearly identical to each other, wherein they are formed like an oblong hole which extends in radial direction.

The distributer 30 has an outer surface which is rotationally symmetric with respect to the axis of rotation 13 and which is adapted to the first casing part (no. 61 in FIG. 7) in a fluid tight manner. The hydraulic pressure in the first to fifth fluid chamber 31-35 urges the distributer 30 in the direction of the axis of rotation 13, such that the second control surface 36 abuts against the first control surface (no. 71 in FIG. 7) in a fluid tight manner. During one revolution of the rotor each first control opening overlaps each second control opening in at least in one rotational position of the rotor.

The first to fifth fluid chamber 31-35 are for formed by grooves on the circumferential surface of the distributor 30, which are arranged along the axis rotation 13 in numerical order. The connection between the first to fourth fluid chambers 31-34 with the second control openings will be explained with reference to FIG. 10 below. These permanent connections are formed by channels inside the distributor 30, which were made during the casting of the blank distributor. The fifth fluid chamber provides a fluid connection between the first and the second control valve, which is marked in FIG. 11 with no. 35.

The notch 38 prevents a rotation of the distributor 30 with respect to the axis of rotation 13. A pin, which is held by the second casing part, extends into the notch 38. By definition the notch is located between the second control openings 3.1 and 3.2.

Figure 10:
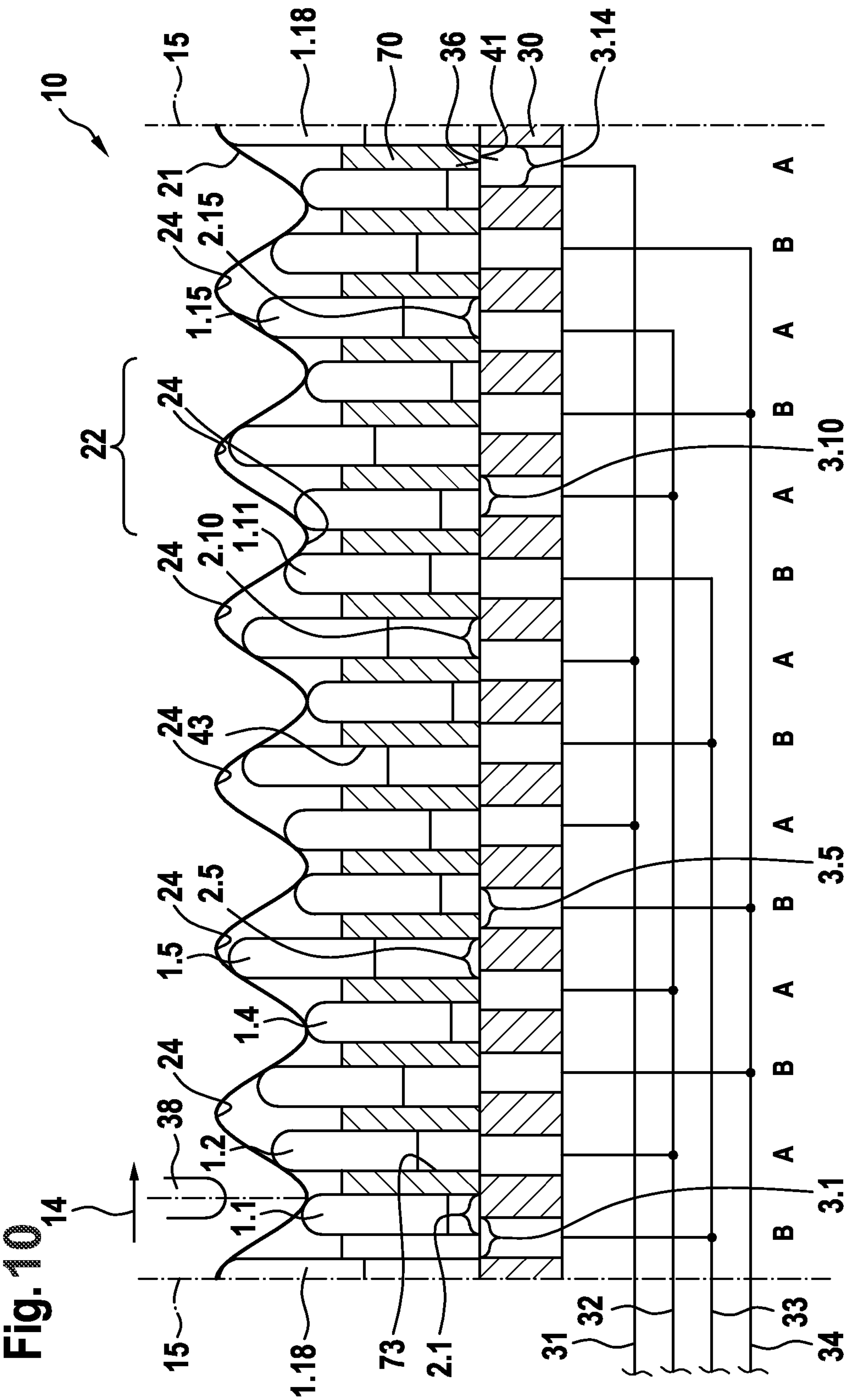
FIG. 10 is a schematic diagram illustrating pistons, first and second control openings, and first to fourth fluid chambers of the machine of FIG. 7.

FIG. 10 shows a schematic diagram comprising the pistons 1.1-1.18, the first and second control openings 2.1-2-18; 3.1-3.14 and the first to fourth fluid chamber 31; 32; 33; 34. For sake of clarity some of the reference numerals 1.1-1.18; 2.1-2.18; 3.1-3.14 were missed out. In all three cases there is a consecutive numbering, which ascends from left to right in FIG. 10.

The piston 1.1-1.18 are equally distributed around the axis of rotation (no. 13 in FIG. 8), wherein they are shown in an unfolded way in FIG. 10. The cam surface 21, the rotor 70 and the distributor 30 are shown correspondingly. The two dash-dot lines 15 refer to the same circumferential position with respect to the axis of rotation (no. 13 in FIG. 8, namely the center of piston 1.18.

The cam surface 21 on the inner circumference of the second casing part (no. 62 in FIG. 7) has seven lobes, wherein it is basically sinus shaped. Further details are explained with reference to FIG. 12. The fluid pressures in the cylinders 74 urge the moveable pistons 1.1-1.18 against the cam surface 21 such that they follow the cam surface 21 when the rotor 70 rotates. In consequence during one rotation of the rotor 70 each piston 1.1-1.18 executes seven strokes.

The distributor 30 has fourteen second control openings 3.1-3.14, i.e., two for each lobe of the cam surface 21. The rotational position of the distributor 30 relative to the cam surface 21 is fixed by a notch 38 (see FIG. 9 too) which engages with a cylindrical pin fixed in the second casing part (no. 62 in FIG. 7), such that each dead center (maximum or minimum) of the cam surface 21 is located between two neighboring second control openings 3.1-3.14.

The rotor 70 has eighteen pistons 1.1-1.18 which are accommodated in a respective cylinder 73 of the rotor 70 so that the can move linearly. Each piston 1.1-1.18 contacts the cam surface 21 via a roller (no. 74 in FIG. 8) which is not shown in FIG. 10. Each cylinder 73 has as a respective first control opening 2.1-2.18, wherein each first control opening 2.1-2.18 overlaps each second control opening 3.1-3.14 during one rotation of the rotor 70.

Below no. 30 in FIG. 10 the internal connections of the distributor are shown, which are selected to provide three switchable non-zero displacement volumes according to the disclosure. Since the first number of pistons 1.1-1.18 and the third number of second control openings 3.1-3.14 have number two as a common prime factor there are pairs of pistons which have a 180° phase relation. For instance piston 1.2 and 1.11 show a phase relation of 180°. In theory it is possible to short circuit such a pair of pistons so that it does no contribute to the overall displacement volume of the multi piston machine, wherein no pressure peaks are produced. This is the basic working principle of U.S. Pat. No. 6,050,173 A. But exactly this option is not used with the present disclosure. There is no position of the first and second control valve (no. 41; 42 in FIG. 11) which results in such a short circuit of the named pair of pistons 1.2/1.11, i.e., in a short circuit between the second and third fluid chamber 32; 33 in the rotor position shown in FIG. 10. Instead the disclosed connections are used.

There is a first and second group of second control openings A; B, wherein neighboring second control openings 2.1-2.14 belong to a different first or second group A; B. The first fluid chamber 3.1 is permanently connected to three second control openings 3.6; 3.8; 3.14 belonging to the first group A. The second fluid chamber 32 is permanently connected to four second control openings 3.2; 3.4; 3.10; 3.12 belonging to the first group A. The third fluid chamber 33 is permanently connected to three second control openings 3.1; 3.7; 3.9 belonging to the second group B. The fourth fluid chamber 34 is permanently connected to four second control openings 3.3; 3.5; 3.11; 3.13 belonging to second group B.

Figure 11:
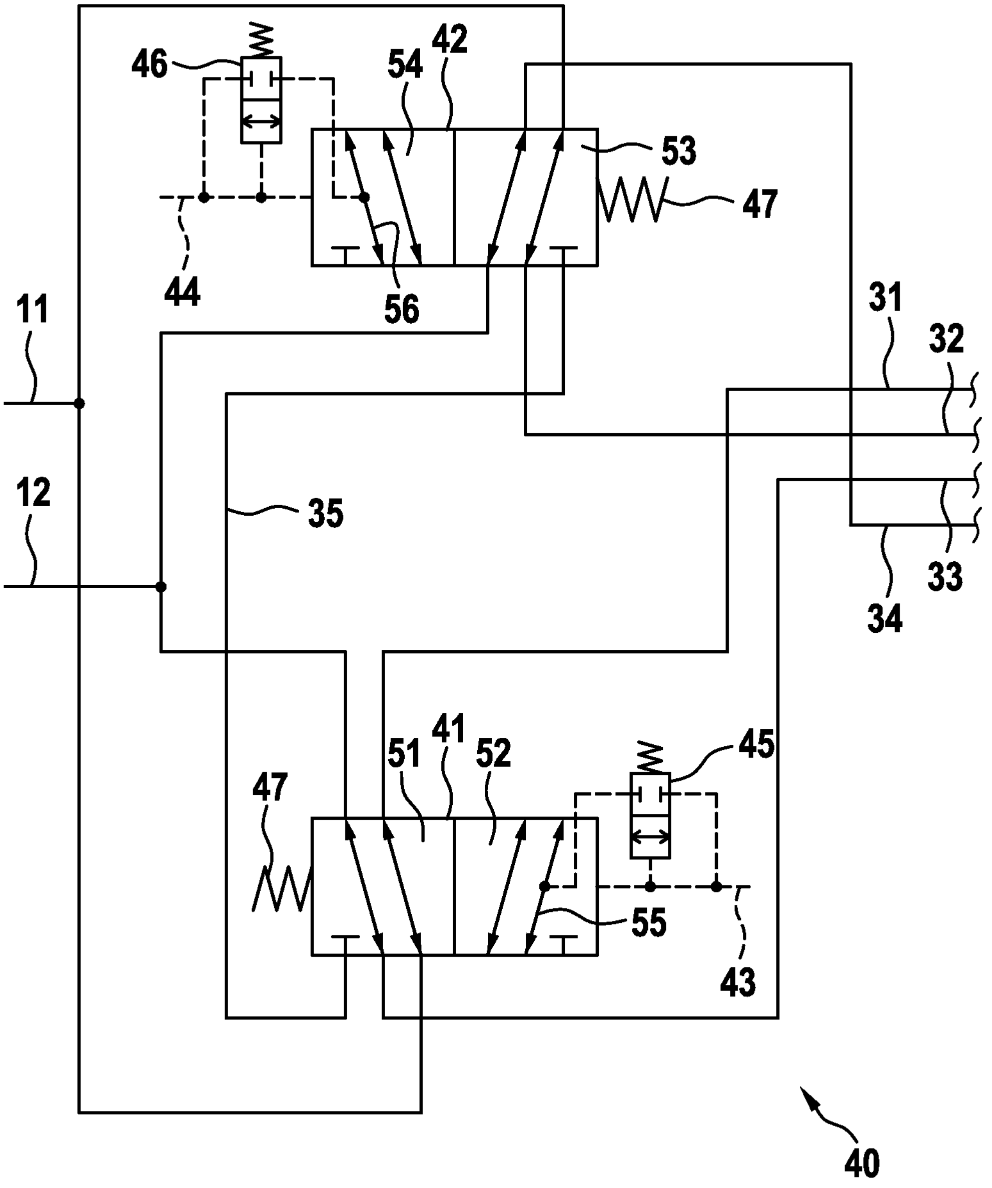
FIG. 11 is a schematic illustrating first and the second control valves, the first to fifth fluid chambers, and first and the second working ports of the machine of FIG. 7.

FIG. 11 shows a schematic comprising the first and the second control valve 41; 42, the first to fifth fluid chamber 31-35 and the first and the second working port 11; 12. The first and the second control valve 41; 42 and the first and the second auxiliary valve 45; 56 are preferably configured as spool valves respectively. The first control valve 41; has a first and a second position 51; 52, wherein the second control valve 42 has a third and a fourth position 53; 54. In FIG. 11, the first and third positions 51; 53 are active such that all second control openings belonging to group A are connected to the first port 11, wherein all second control openings belonging to group B are connected to the second working port 12. Namely the first control valve 41 connects the first working port 11 with the first fluid chamber 31 and the second working port 12 with the third fluid chamber 33. The second control valve 42 connects the first working port 11 with the second fluid chamber 32 and the second working port 12 with the fourth fluid chamber 34. The fifth fluid chamber 35 is not used in this switching position, in which the multi piston machine works with the maximum displacement volume.

The second to maximum displacement volume is an active, when the first control valve 41 is in the second position 52, wherein the second control valve 42 is in the third position 53. Then the first working port 11 is only connected to the second fluid chamber 32, wherein the second working port 12 is only connected to the fourth fluid chamber 34 wherein both connections are provided by the second control valve 42. The first control valve 41 provides a direct connection between the first and the third fluid chamber 31; 33 via its first short circuit connection 55. Consequently the second control openings 3.1; 3.6; 3.7; 3.8; 3.9; 3.14 are connected to each other. The two pairs 3.1/3.8 and 3.8/3.14 provide an exact 180° phase shift. The remaining pair 3.6/3.9 does not exactly provide a 180° phase shift, but nearly. To minimize pressure peaks due to this small miss-match the first auxiliary valve 45 provides a connection between the first short connection 55 and the first control port 43, when it is switched into its open position by a pressure in the first control port 43, which urges the first control valve 41 into is second position 52. In this state eight of the fourteen second control openings contribute to the net displacement volume so that the net displacement volume is 8/14 of the maximum displacement volume.

The third to maximum displacement volume is an active, when the first control valve 41 is in the first position 51, wherein the second control valve 42 is in the fourth position 54. Then the first working port 11 is only connected to the first fluid chamber 31, wherein the second working port 12 is only connected to the third fluid chamber 33 wherein both connections are provided by the first control valve 41. The second control valve 42 provides a direct connection between the second and the fourth fluid chamber 32; 34 via its second short circuit connection 56. Consequently the second control openings 3.2; 3.3; 3.4; 3.5; 3.10; 3.11; 3.12; 3.13 are connected to each other. The three pairs 3.3/3.10; 3.4/3.11; and 3.5/3.12 provide an exact 180° phase shift. The remaining pair 3.2/3.13 does not exactly provide a 180° phase shift, but nearly. To minimize pressure peaks due to this small miss-match the second auxiliary valve 46 provides a connection between the second short connection 46 and the second control port 44, when it is switched into its open position by a pressure in the second control port 44, which urges the second control valve 42 into its fourth position 54. In this state six of the fourteen second control openings contribute to the net displacement volume so that the net displacement volume is 6/14 of the maximum displacement volume.

When first control valve 41 is switch into its second position 52 and the second control valve 42 is switched into its fourth position 54 the multi piston machine is in a free-wheeling state. There is a direct connection between the first and the second working 11; 12 ports via the fifth fluid chamber 35. Furthermore the first to fourth fluid chamber 31-34 are short circuited to each other. When the multi piston machine drives an associated wheel of a vehicle, the wheel can be turned with low resistance, wherein fluid pressure at the first or second working port 11; 12 does not drive the vehicle.

Figure 12:
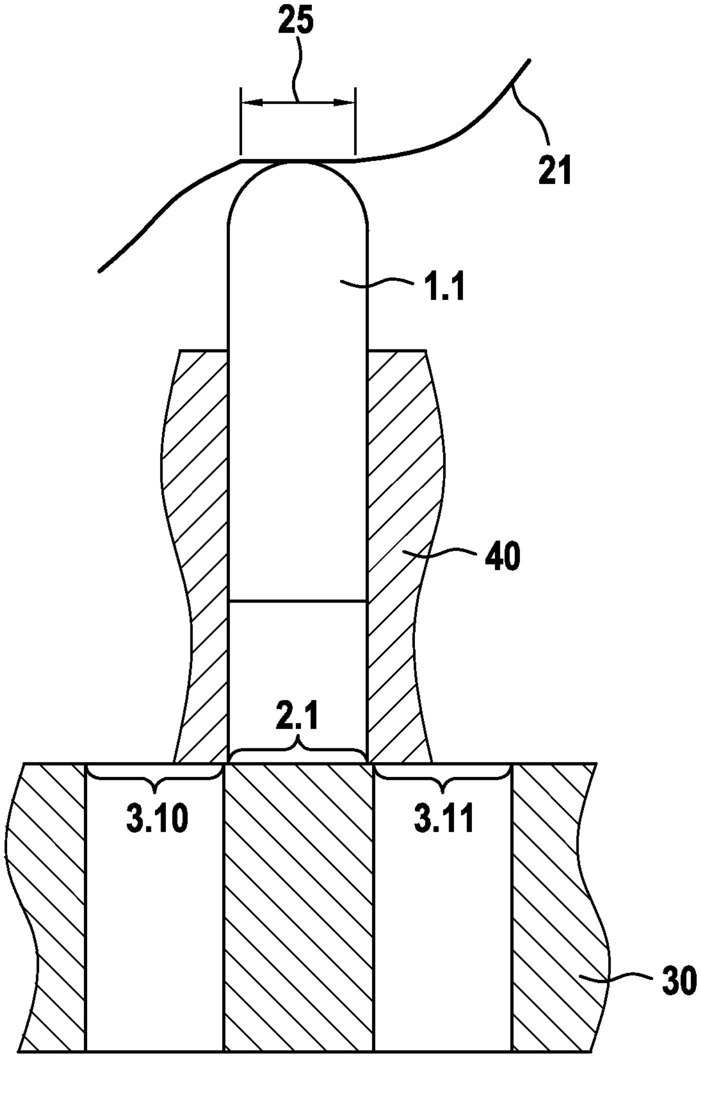
FIG. 12 is a schematic diagram based on FIG. 9 dwell sections of the machine of FIG. 1.

FIG. 12 shows a schematic diagram based on FIG. 9 comprising the dwell sections 25. As described above in the reduced displacement modes some deviation from a perfect 180° phase relationship is accepted. Most of the time the resulting pressure peaks are satisfactorily minimized by the first and second auxiliary valves (no. 45; 46 in FIG. 11). The pressure peaks may be further reduced by introducing dwell sections 25 at critical positions of the cam surface 21. A dwell section 25 extends to about 0.5° to 2° of rotor rotation. The dwell section 25 is formed in a way that a piston contacting the dwell section 25 does not move when the rotor is turned, as long as it contacts the dwell section 25.

Based on experiment it can easily be figured out at which rotational positions the pressure peaks occur. Based on the description above the pistons producing the pressure peaks are known. The dwell sections 25 are introduced correspondingly. Their length is selected as low as possible but long enough to reduce the offending pressure peaks. Experiments of the applicant have shown that it is desirable the choose dwell sections 25 with different length at different positions. Preferably, the dwell sections 25 are located at a position where the offending piston e.g. 1.1 is at the center between two neighboring second control openings e.g. 3.10; 3.11.

REFERENCE NUMERALS

A first group of second control openings
B second group of second control openings
1.1 . . . 1.18 piston
2.1 . . . 2.18 first control opening
3.1 . . . 3.14 second control opening
10 multi piston machine
11 first working port
12 second working port
13 axis of rotation
14 angle of rotation
15 dash-dot line
21 cam surface
22 lobe
23 cam ring
24 dead center
25 dwell section
30 distributor
31 first fluid chamber
32 second fluid chamber
33 third fluid chamber
34 fourth fluid chamber
35 fifth fluid chamber
36 second control surface
37 second circle
38 notch (alignment cam surface)
41 first control valve
42 second control valve
43 first control port
44 second control port
45 first auxiliary valve
46 second auxiliary valve
47 spring
51 first position
52 second position
53 third position
54 fourth position
55 first short circuit connection
56 second short circuit connection
60 casing
61 first casing part
62 second casing part (cam ring)
63 third casing part
64 fourth casing part
65 first flange
66 second flange
70 rotor
71 first control surface
72 first circle
73 cylinder
74 roller
75 splined bore

What is claimed is:

1. A multi piston machine comprising:

a casing having a first working port and a second working port, the casing defining a cam surface having a second number of lobes;

a rotor located within the casing and configured for rotation about an axis of rotation, the rotor defining a first control surface;

a plurality of pistons;

a first control valve; and a second control valve, wherein:

a first number of pistons of the plurality of pistons are received in the rotor in a linearly movable manner, the pistons are configured to contact the cam surface of the casing, a number of strokes of a single piston during one revolution of the rotor equals the second number, each piston has one associated first control opening at the first control surface of the rotor, the first control openings are located along a first circle having a center defined by the axis of rotation, a distributor defines a second control surface configured to abut against the first control surface, the second control surface has a third number of second control openings located along a second circle having a center defined by the axis of rotation, each of the first control openings overlap each of the second control openings in at least one rotational position of the rotor respectively, there is a first, a second, a third, and fourth fluid chamber, each of the second control openings is permanently connected to a single one of the first to fourth fluid chambers, and each of the first to fourth fluid chambers is permanently connected to at least one of the second control openings, the multi piston machine is switchable between at least three non-zero displacement volumes using the first control valve and the second control valve, the first control valve has a first valve port permanently connected to the first fluid chamber and a second valve port permanently connected to the third fluid chamber, the second control valve has a third valve port permanently connected to the second fluid chamber and a fourth valve port permanently connected to the fourth fluid chamber, the first and the second control valves are connected to the first and the second working ports respectively, the third number is twice the second number, there is a first and a second group of the second control openings, adjacent second control openings belong to a different first or second group, the second control openings of the first group are either connected to the first or the second fluid chamber, the second control openings of the second group are either connected to the third or the fourth fluid chamber, the first control valve has a first and a second position, in the first position of the first control valve, the first fluid chamber is connected to the first working port, and the third fluid chamber is connected to the second working port, and in the second position of the first control valve, the first and the third fluid chambers are directly connected to each other, and the connection to the first and the second working ports is blocked.

2. The multi piston machine according to claim 1, wherein:

the first control valve has a first control port, a pressure at the first control port urges the first control valve into the second position of the first control valve, in the second position of the first control valve, the first control port is connected to the first and the third fluid chambers, and in the first position of the first control valve, the connection of the first control port to the first and the third fluid chambers is blocked.

3. The multi piston machine according to claim 2, wherein:

the second control valve has a third and a fourth position, in the third position of the second control valve, the second fluid chamber is connected to the first working port, and the fourth fluid chamber is connected to the second working port, and in the fourth position of the second control valve, the second and the fourth fluid chambers are directly connected to each other, and the connection to the first and the second working ports is blocked.

4. The multi piston machine according to claim 3, wherein:

the second control valve has a second control port, a pressure at the second control port urges the second control valve into the fourth position of the second control valve, in the fourth position of the second control valve, the second control port is connected to the second and the fourth fluid chambers, and in the third position of the second control valve, the connection of the second control port to the second and the fourth fluid chambers is blocked.

5. The multi piston machine according to claim 3, wherein when the first control valve is in the second position of the first control valve and the second control valve is in the fourth position of the second control valve, the first and the second working ports are directly connected to each other via the first and the second control valves.

6. The multi piston machine according to claim 1, wherein:

the first fluid chamber is connected to a fourth number of the second control openings, the third fluid chamber is connected to the fourth number of the second control openings, the second fluid chamber is connected to a fifth number of the second control openings, the fourth fluid chamber is connected to the fifth number of the second control openings, and the fourth number and the fifth number differ by at least one.

7. The multi piston machine according to claim 6, wherein:

the first and the second number have no common prime factor besides one, the cam surface has at least two dwell sections, in which a distance between the axis of rotation and the cam surface is constant, such that one of the pistons contacting the dwell section does not move while the rotor rotates, and an angular extent of at least two dwell sections is different from each other.

8. The multi piston machine according to claim 7, wherein:

the first number is eighteen, the second number is seven, the third number is fourteen, the fourth number is three, and the fifth number is four.

9. The multi piston machine according to claim 1, wherein first number is larger than the third number by at least three.

10. The multi piston machine according to claim 1, wherein within the same first or second group at maximum two adjacent second control openings are connected to the same fluid chamber from the first to the fourth fluid chambers.

11. The multi piston machine according to claim 1, wherein:

a moving direction of the pistons is radially with respect to the axis of rotation, and a first and a second row of pistons are offset relative to each other in a direction of the axis of rotation.

12. The multi piston machine according to claim 1, wherein:

the lobes of the cam surface define multiple dead centers, a distance from the cam surface to the axis of rotation is a minimum or a maximum at the dead center, and each second control opening is located distant to named dead centers in a circumferential direction with respect to the axis of rotation.

13. A multi piston machine comprising:

a casing having a first working port and a second working port, the casing defining a cam surface having a second number of lobes;

a rotor located within the casing and configured for rotation about an axis of rotation, the rotor defining a first control surface;

a plurality of pistons;

a first control valve; and a second control valve, wherein:

a first number of pistons of the plurality of pistons are received in the rotor in a linearly movable manner, the pistons are configured to contact the cam surface of the casing, a number of strokes of a single piston during one revolution of the rotor equals the second number, each piston has one associated first control opening at the first control surface of the rotor, the first control openings are located along a first circle having a center defined by the axis of rotation, a distributor defines a second control surface configured to abut against the first control surface, the second control surface has a third number of second control openings located along a second circle having a center defined by the axis of rotation, each of the first control openings overlap each of the second control openings in at least one rotational position of the rotor respectively, there is a first, a second, a third, and fourth fluid chamber, each of the second control openings is permanently connected to a single one of the first to fourth fluid chambers, the multi piston machine is switchable between at least three non-zero displacement volumes using the first control valve and the second control valve, the first control valve is connected to the first and the third fluid chambers, the second control valve is connected to the second and the fourth fluid chambers, the first and the second control valves are connected to the first and the second working ports respectively, the third number is twice the second number, there is a first and a second group of the second control openings, adjacent second control openings belong to a different first or second group,
the second control openings of the first group are either connected to the first or the second fluid chamber,
the second control openings of the second group are either connected to the third or the fourth fluid chamber,
the first control valve has a first and a second position,
in the first position of the first control valve, the first fluid chamber is connected to the first working port, and the third fluid chamber is connected to the second working port,
in the second position of the first control valve, the first and the third fluid chambers are directly connected to each other, and the connection to the first and the second working ports is blocked,
the first control valve has a first control port,
a pressure at the first control port urges the first control valve into the second position of the first control valve,
in the second position of the first control valve, the first control port is connected to the first and the third fluid chambers, and
in the first position of the first control valve, the connection of the first control port to the first and the third fluid chambers is blocked.

14. The multi piston machine according to claim 13, wherein:
the second control valve has a third and a fourth position,
in the third position of the second control valve, the second fluid chamber is connected to the first working port, and the fourth fluid chamber is connected to the second working port, and
in the fourth position of the second control valve, the second and the fourth fluid chambers are directly connected to each other, and the connection to the first and the second working ports is blocked.

15. The multi piston machine according to claim 14, wherein:
the second control valve has a second control port,
a pressure at the second control port urges the second control valve into the fourth position of the second control valve,
in the fourth position of the second control valve, the second control port is connected to the second and the fourth fluid chambers, and
in the third position of the second control valve, the connection of the second control port to the second and the fourth fluid chambers is blocked.

16. The multi piston machine according to claim 14, wherein when the first control valve is in the second position of the first control valve and the second control valve is in the fourth position of the second control valve, the first and the second working ports are directly connected to each other via the first and the second control valves.

17. A multi piston machine comprising:
a casing having a first working port and a second working port, the casing defining a cam surface having a second number of lobes;
a rotor located within the casing and configured for rotation about an axis of rotation, the rotor defining a first control surface;
a plurality of pistons;
a first control valve; and
a second control valve,
wherein:
a first number of pistons of the plurality of pistons are received in the rotor in a linearly movable manner,
the pistons are configured to contact the cam surface of the casing,
a number of strokes of a single piston during one revolution of the rotor equals the second number,
each piston has one associated first control opening at the first control surface of the rotor,
the first control openings are located along a first circle having a center defined by the axis of rotation,
a distributor defines a second control surface configured to abut against the first control surface,
the second control surface has a third number of second control openings located along a second circle having a center defined by the axis of rotation,
each of the first control openings overlap each of the second control openings in at least one rotational position of the rotor respectively,
there is a first, a second, a third, and fourth fluid chamber,
each of the second control openings is permanently connected to a single one of the first to fourth fluid chambers, and each of the first to fourth fluid chambers is permanently connected to at least one of the second control openings,
the multi piston machine is switchable between at least three non-zero displacement volumes using the first control valve and the second control valve,
the first control valve is connected to the first and the third fluid chambers,
the second control valve is connected to the second and the fourth fluid chambers,
the first and the second control valves are connected to the first and the second working ports respectively,
the third number is twice the second number,
there is a first and a second group of the second control openings,
adjacent second control openings belong to a different first or second group,
the second control openings of the first group are either connected to the first or the second fluid chamber,
the second control openings of the second group are either connected to the third or the fourth fluid chamber,
the first control valve has a first and a second position,
in the first position of the first control valve, the first fluid chamber is connected to the first working port, and the third fluid chamber is connected to the second working port, and
in the second position of the first control valve, the first and the third fluid chambers are directly connected to each other, and the connection to the first and the second working ports is blocked.

* * * * *